United States Patent [19]
Kobylinski et al.

[11] 3,907,835
[45] Sept. 23, 1975

[54] PREPARATION OF MALEIC ANHYDRIDE USING A CATALYST CONTAINING A URANYL ION

[75] Inventors: Thaddeus P. Kobylinski, Cheswick; Brian W. Taylor, Gibsonia, both of Pa.

[73] Assignee: Gulf Research & Development Company, Pittsburgh, Pa.

[22] Filed: May 21, 1973

[21] Appl. No.: 362,493

Related U.S. Application Data

[63] Continuation of Ser. No. 145,518, May 20, 1971, abandoned, and a continuation of Ser. No. 145,549, May 20, 1971, abandoned.

[52] U.S. Cl............................. 260/346.8; 252/437
[51] Int. Cl.$^2$....................................... C07D 307/60
[58] Field of Search ...... 260/346.8 A; 145/549, 518

[56] References Cited
UNITED STATES PATENTS
2,954,385    9/1960    Burney et al. .................. 260/346.8
FOREIGN PATENTS OR APPLICATIONS
1,248,508    11/1959    France OTHER PUBLICATIONS
Vaidyanathan, "Chem. Age of India," May 1968, Vol. 19, No. 5, p. 363–368.
Bhattacharyya et al., "J. Applied Chemistry," Nov. 1958, p. 728–735.

*Primary Examiner*—Henry R. Jiles
*Assistant Examiner*—Bernard T. Dentz

[57] ABSTRACT

A process for converting benzene; an ethylenically unsaturated aliphatic hydrocarbon having from 4 to 5 carbon atoms per molecule and from 1 to 2 olefinic double bonds, and wherein said 4 carbon atom hydrocarbon is unbranched; or a monoethylenically unsaturated straight-chain aldehyde having from 4 to 5 carbon atoms per molecule and wherein the olefinic double bond is in the beta position with respect to the carbonyl group, to maleic anhydride by catalytic oxidation in the presence of a catalyst comprising a uranyl ion, especially uranium phosphate. One preferred form of the catalyst comprises an intimate chemical admixture of vanadium, uranium, phosphorus and oxygen wherein the uranium to phosphorus mole ratio is from 0.2:1 to 2:1; wherein the phosphorus to oxygen mole ratio is from 0.1:1 to 0.35:1; and wherein the vanadium to uranium atomic ratio is from 0.1:1 to 2:1. A method of preparation of the catalyst composition is also disclosed.

22 Claims, No Drawings

PREPARATION OF MALEIC ANHYDRIDE USING A CATALYST CONTAINING A URANYL ION

This application combines the subject matter of Ser. No. 145,518 and Ser. No. 145,549, both filed on May 20, 1971, in the names of Tadeusz P. Kobylinski and Brian W. Taylor; both assigned to the same assignee and both now abandoned; and is a continuing application thereof.

This invention relates to a method for preparing maleic anhydride from certain unsaturated compounds in the contact presence of a catalyst comprising a uranyl ion.

Processes are known in the prior art for the preparation of dicarboxylic anhydrides, such as maleic anhydride, by the catalytic oxidation of certain hydrocarbons such as butene-1 in the presence of air at elevated temperatures using various catalysts. A novel catalyst has now been discovered for promoting the oxidation of certain unsaturated compounds to produce maleic anhydride in reasonable yield.

In accordance with the invention, maleic anhydride is produced by the catalytic oxidation of benzene; an ethylenically unsaturated aliphatic hydrocarbon having from 4 to 5 carbon atoms per molecule and from 1 to 2 olefinic double bonds, and wherein said 4 carbon atom hydrocarbon is unbranched; or a monoethylenically unsaturated straight-chain aldehyde having from 4 to 5 carbon atoms per molecule and wherein the olefinic double bond is in the beta position with respect to the carbonyl group, in the presence of a gas containing free molecular oxygen and a catalyst comprising a uranium phosphate under oxidation conditions.

In one aspect of the invention, the catalyst comprises an intimate chemical admixture of vanadium, uranium, phosphorus and oxygen wherein the uranium to phosphorus mole ratio is from 0.2:1 to 2:1; wherein the phosphorus to oxygen mole ratio is from 0.1:1 to 0.35:1 and wherein the vanadium to uranium atomic ratio is from 0.1:1 to 2:1 under oxidation conditions.

The charge stock for the process of this invention can suitably be benzene; an ethylenically unsaturated aliphatic hydrocarbon having from 4 to 5 carbon atoms per molecule and from 1 to 2 olefinic double bonds, and wherein said 4 carbon atom hydrocarbon is unbranched; or a monoethylenically unsaturated straight-chain aldehyde having from 4 to 5 carbon atoms per molecule and wherein the olefinic double bond is in the beta position with respect to the carbonyl group.

Examples of ethylenically unsaturated aliphatic hydrocarbons having from 4 to 5 carbon atoms per molecule and from 1 to 2 olefinic double bonds and wherein said 4 carbon atom hydrocarbon is unbranched include butene-1; butene-2; butadiene; pentene-1; pentene-2; 2-methylbutene-1; 2-methyl-butene-2; and 2-methylbutadiene.

Examples of monoethylenically unsaturated straight-chain aldehydes having from 4 to 5 carbon atoms per molecule and wherein the olefinic double bond is in the beta position with respect to the carbonyl group include 2-butenal(crotonaldehyde) and 2-pentenal.

The unsaturated charge material is usually admixed with a gas containing free molecular oxygen, and this admixture is preheated to reaction temperature before being contacted with the novel catalyst of this invention in a suitable reaction zone. As noted below, the reaction temperature for the conversion of the unsaturated aldehydes is lower than the temperature for the conversion of benzene or the aliphatic olefins and thus less preheat is required for the aldehyde charge stock. Any gas containing free molecular oxygen can be employed which contains from 5 to 30 percent free molecular oxygen in addition to an inert gas such as helium, nitrogen, argon, etc. Usually and preferably, air will be employed as the oxidizing gas. Under the high temperature conditions of this reaction, mixtures of olefin and air form an explosive mixture. To avoid this, the concentration of olefin in the incoming gas stream to the reactor is suitably maintained from 0.5 to 2.0 weight percent, preferably about 0.75 to 1.5 weight percent. The concentration of benzene; 2-butenal and 2-pentenal is also in this range.

The reaction temperature is suitably from 375°C. to 600°C. and is preferably from 450°C. to 525°C. for the hydrocarbon charge stocks, i.e., benzene or the aliphatic olefins. When the $C_4$ and $C_5$ unsaturated aldehydes are used as the charge stock, suitable reaction temperatures are from 300°C. to 500°C., preferably from 350°C. to 470°C. Very little effective oxidation of the hydrocarbon charge stocks occurs below 375°C., while above 600°C. the by-product formation of $CO_2$ becomes excessively high. The reaction pressure is generally atmospheric, although slight pressures of up to 20 psig can be employed if desired. Subatmospheric pressures can also be utilized but have no added advantage. The mixture of charge stock and air is contacted with the novel catalyst of this invention at the desired reaction temperature at gaseous hourly space velocities of from 1,000 to 10,000 volumes of total gas per volume of catalyst per hour. The preferred GHSV's are from 2,500 to 6,000.

The oxidation reaction is highly exothermic and methods must be employed to control the temperature of the reaction else overheating of portions of the catalyst bed will develop, resulting in loss of the charge stock due to total oxidation to byproducts such as $CO_2$. Any suitable cooling means or dilution means can be employed. One suitable procedure is to admix the oxidation catalyst with an inert material such as quartz in such a way that the concentration of the oxidation catalyst increases in the bed in a direction opposite to the flow of the charge stock. Suitably the catalyst is arranged in a bed containing from 10 to 90 weight percent of a diluent inert material and from 90 to 10 weight percent of said uranyl ion containing catalyst. Preferably the diluent and uranyl ion containing material are admixed in such a way that the uranium content increases through the bed in a direction parallel to the flow of the charge stock, for example, logarithmically. Other methods of controlling the reaction temperature would include the injection of paraffins or other diluents through the reaction bed or controlling the reaction cooling in a molten bath, etc.

The reactants are suitably cooled as they leave the reactor. The reactants can be quenched by contact with steam followed by passage through water, but this converts the maleic anhydride to maleic acid which then can be suitably separated and recovered by evaporation. Solid maleic anhydride can be directly collected by suitable non-aqueous cooling of the products and separation of the solid maleic anhydride from the unreacted olefin and inert gases.

The novel catalyst of this invention is one comprising a uranyl ion. By a "uranyl ion" is meant $UO_2^{+2}$. Preferably the catalyst contains not only uranium and oxygen but also phosphorus wherein the ratio of phosphorus to uranium can be from 0.6:1 to 12:1, but is preferably about 1:1.

The preferred uranium catalysts have the formula:

$$U_xO_yP_zH_n$$

where $x$ is an integer from 1 to 3; $y$ is an integer from 2 to 42; $z$ can vary from 0 to 12; and $n$ can vary from 0 to 2. More preferably, $x$ is 1, $y$ is from 7 to 12, $z$ is from 2 to 4, and $n$ is 1.

Examples of uranyl ion containing materials which can be employed as catalysts for the process of this invention include uranium sulfate ($UO_2SO_4$) and those uranium compounds as are shown in Table I below:

TABLE I

| x | Y | $U_xO_yP_zH_n$ z | n | |
|---|---|---|---|---|
| 1 | 6 | 1 | 1 | $UO_2HPO_4$ |
| 1 | 2 | 0 | 0 | $UO_2$ |
| 1 | 3 | 0 | 0 | $UO_3$ |
| 2 | 5 | 0 | 0 | $U_2O_5$ |
| 3 | 8 | 0 | 0 | $U_3O_8$ |
| 1 | 7 | 2 | 0 | $UP_2O_7$ |
| 1 | 8 | 2 | 2 | $U(HPO_4)_2$ |
| 1 | 12 | 4 | 0 | $U(PO_3)_4$ |
| 3 | 16 | 4 | 0 | $U_3(PO_4)_4$ |

Methods of making the uranyl ion containing catalyst of this invention are well known in the art and form no part of this invention. For example, uranyl phosphate ($UO_2HPO_4$) may be prepared by dissolving uranium nitrate in water; adding phosphoric acid and precipitating the uranyl phosphate by the addition of a suitable base such as ammonia or ammonium hydroxide. The uranium oxides can suitably be prepared by decomposition of uranium nitrates by heating.

The uranyl ion containing materials specified above are preferably used as catalysts in the process of this invention in an unsupported form. If desired, these uranyl ion containing materials can be distended on a support. The support is preferably a neutral, low surface area (less than 25 square meters per gram) support such as alpha-alumina or silicon carbide. The use of high surface area supports tends to result in over-oxidation of the charge stock.

The invention will be further described with reference to the following experimental work:

EXAMPLE 1

A catalyst for partial oxidation of butene-2 to maleic anhydride was prepared as follows. 50 grams of $UO_2(NO_3)_2 \cdot 6H_2O$ was dissolved in 1500 cc's of water and 20 grams of concentrated $H_3PO_4$ was added. The resulting solution was vigorously stirred and an adequate amount of 28 percent $NH_4OH$ solution was added dropwise to achieve pH = 8. Precipitate was separated and dried at 120°C. and calcined at 480°C. for 12 hours. 20 cc's of the final catalyst (10–30 mesh) was loaded into the stainless steel reactor surrounded by the bronze block. The bronze block was connected to the compressed air line to dissipate the excess heat formed as a result of the highly exothermic butene oxidation reaction. On top of the catalyst 80 cc's of quartz chips were loaded and served as a preheating zone. The bottom of the catalyst was supported on the stainless steel mesh, below which a water spray was installed. A reaction mixture consisted of one percent butene-2 in air. The mixture was fed to the top of reactor at a total rate of 4000 GHSV. At a temperature of 510°C. the yield of maleic anhydride was 25 mole percent based on the total moles of butene-2 fed. The conversion of butene-2 was 100 percent. Maleic anhydride was recovered by passing the reactor effluent through cooled water traps. Other experiments were run at 460°C. to 530°C. The optimum temperature was 510°C.

EXAMPLE 2

Example 1 was repeated except the catalyst was loaded into the reactor in three separate zones: the top zone was diluted with quartz chips, giving a ratio of quartz to catalyst of 4:1; the middle zone had a ratio of quartz to catalyst of 1:4. The conversion of butene-2 was 100 percent and the yield of maleic anhydride was 35 mole percent at an optimum temperature of 516°C.

EXAMPLE 3

Example 2 was repeated except ammonium phosphate was used to precipitate the uranium nitrate. The conversion of butene-2 was 100 percent, while the yield of maleic anhydride was 32 mole percent at an optimum temperature of 515°C.

EXAMPLE 4

Example 2 was repeated except butene-1 was used in place of butene-2. The conversion of butene-1 was 100 percent, while the yield of maleic anhydride was 34.5 percent at an optimum temperature of 520°C.

A comparison of Examples 2 and 4 shows that butene-1 and butene-2 are equivalent charge stocks for the subject reaction.

Experiments were also conducted for the conversion of butene-2 to maleic anhydride utilizing as the catalyst uranyl sulfate which was calcined at 600°C., calcined $U_2O_5$ and calcined $UO_3$. Each of these catalysts was successful in the conversion of butene-2 to maleic anhydride, although lower yields were experienced.

Example 2 was repeated except using either benzene or crotonaldehyde as the charge stock to produce maleic anhydride. Results similar to the results using butene-2 as the feed were obtained, i.e., yields of maleic anhydride of about 35 mole percent were achieved.

The above described oxidation reactions under the same conditions as described above may be promoted by a catalyst comprising an intimate chemical admixture of vanadium, uranium, phosphorus and oxygen wherein the uranium to phosphorus mole ratio is from 0.2:1 to 2:1; wherein the phosphorus to oxygen mole ratio is from 0.1:1 to 0.35:1; and wherein the vanadium to uranium atomic ratio is from 0.1:1 to 2:1. Preferably in the new composition, the uranium to phosphorus mole ratio is from 0.7:1 to 1.5:1; the phosphorus to oxygen mole ratio is from 0.2:1 to 0.3:1; and the vanadium to uranium atomic ratio is from 0.5:1 to 1.5:1. In the new composition of this invention, substantially all of the phosphorus atoms are directly connected to either uranium or vanadium atoms, and wherein substantially all of the oxygen is directly connected to a phosphorus, uranium or vanadium atom. In the composition there may also be small amounts of hydrogen but, while it is not certain, it is believed any hydrogen present is unstable and is chemically released at the high temperatures in the presence of oxygen.

The new composition is prepared by mixing an anhydrous uranium salt with a solution of vanadyl oxalate to form a first reaction mixture. Concentrated phosphoric acid having an H₃PO₄ content of from 82 to 86 weight percent is then added to the first reaction mixture in a sufficient amount so that the uranium to phosphorus mole ratio is from 0.2:1 to 2:1 and the phosphorus to oxygen mole ratio is from 0.1:1 to 0.35:1. This addition of phosphoric acid occurs at ambient conditions although higher or lower temperatures and pressures can be used but are obviously not preferred. The phosphoric acid on mixing with the first reaction mixture reacts with the uranium salt and the vanadyl oxalate in some manner to form an intimate chemical admixture of uranium, vanadium, phosphorus and oxygen as defined above. The reaction product is slowly dried at a temperature from about 25°C. to about 140°C for about 4 to 12 hours. If the lower temperatures are used, they preferably are accompanied by use of vacuum or purging with nitrogen. The temperature of the dried reaction product is then gradually increased to a calcination temperature from 420°C. to 500°C. A suitable increase in temperature is at the rate of about 0.5°C. to 2°C. per minute. In any event, the rate of heating from the drying temperature to the calcination temperature should be such that the formed reaction product does not react vigorously in the sense that there is no substantial volume increase. If heating is too quick, a volume increase occurs and some unknown, undesirable reactions occur which render the final composition less active as a catalyst for the conversion of the charge material, e.g., 2-butene, to maleic anhydride. Preferably the calcination temperature is from 460°C. to 490°C. By calcination is meant heating in air for a time of from about 4 to 48 hours.

Any uranium salt can be utilized to prepare the new compositions of this invention, such as those described above.

Vanadyl oxalate is the source of supply for the vanadium component of the new compositions of this invention. The vanadyl oxalate is suitably dissolved in a solvent before it is admixed with the anhydrous uranium salt defined above. Suitable solvents for the vanadyl oxalate include oxalic acid, formamide, phosphoric acid and acetic acid. The amount of vanadyl oxalate solution to admix with the anhydrous uranium salt is not critical, but the amount should be such that the vanadium to uranium atomic ratio in the final dried catalyst is from 0.1:1 to 2:1, preferably from 0.7:1 to 1.3:1. Since the admixture of the vanadyl oxalate and the anhydrous uranium salt must eventually be dried, it is preferred to use a minimum amount of solvent in forming the vanadyl oxalate solution. For example, the amount of vanadyl oxalate solution can suitably be such that a paste results when admixed with the anhydrous uranium salt. The anhydrous uranium salt is not soluble in those solvents which dissolve vanadyl oxalate.

Concentrated phosphoric acid is then used to cause some reaction between the uranium, vanadium and phosphorus. By a "concentrated phosphoric acid" is meant phosphoric acid having an H₃PO₄ content of from 82 to 86 weight percent. Usually the amount of concentrated phosphoric acid is from 10 to 50 weight percent of the admixture of the uranium salt and the vanadyl oxalate solution. Sufficient phosphoric acid must be employed so that the uranium to phosphorus mole ratio is from 2:1 to 0.2:1 and the phosphorus to oxygen mole ratio is from 0.35:1 to 0.1:1 in the final dried catalyst. Excess phosphoric acid can be used but gives rise to free P₂O₅ in the catalyst and this excess P₂O₅ lowers the activity of the catalyst.

This invention will be further described with reference to the following experimental work.

50 grams of UO₂(NO₃)₂·6H₂O were dissolved in 1500 cc's of water, and 20 grams of concentrated phosphoric acid having an H₃PO₄ content of 85 weight percent was added. The resulting solution was vigorously stirred and an adequate amount of 28 percent NH₄OH solution was added dropwise to achieve a pH of eight. The precipitate was separated and dried at 120°C. and calcined at 480°C. for 12 hours. Constant amounts of this anhydrous uranium phosphate as shown in Table II below were added to a boiling solution of varying amounts of vanadyl oxalate in 23 grams of formamide. A paste was formed and 20 grams of concentrated phosphoric acid having an H₃PO₄ content of 85 weight percent was added. After stirring to obtain intimate contacting of the phosphoric acid with the paste, the resulting mixture was dried at 200°C. for 12 hours and thereafter the catalyst was calcined at 480°C. for about 12 hours. The dried mixture was heated at the rate of about 1°C. per minute to reach the calcination temperature of 480°C. Each of these catalysts was then tested for the oxidation of butene-2 to maleic anhydride at a series of temperatures from 460°C. to 530°C., a pressure of 1 psig and at a total gas rate of 4,000 GHSV (gaseous hourly space velocity). Sufficient air was added so that the weight percent butene-2 in the gas stream was about one. The results of these runs are shown in Table II below:

Table II

| Ex. No. | Vanadyl[1] Oxalate, g. | H₃PO₄ grams | Wt. % V₂O₅ in Final Catalyst | Atomic Ratio V/U | Yield of M.A. Mole % | Temp. of Max. Yield of M.A. |
|---|---|---|---|---|---|---|
| 5 | 16.8 | 20 | 48 | 1.8 | 41.0 | 510 |
| 6 | 8.2 | 20 | 24 | 0.9 | 55.2 | 511 |
| 7 | 4.1 | 20 | 12 | 0.4 | 48.7 | 510 |
| 8 | 2.0 | 20 | 6.2 | 0.2 | 36.1 | 520 |
| 9 | 1.0 | 20 | 3.1 | 0.1 | 35.2 | 513 |
| 10 | 0 | 20 | 0 | — | 35.0 | 510 |

[1]In each case the grams of vanadyl oxalate were dissolved in 23 grams of formamide Referring to Table II, it can be seen that the yield of maleic anhydride is optimized when the vanadium content in the final catalyst is from about 6 to about 40, preferably 6 to 35, percent calculated as V₂O₅.

EXAMPLE 11

Example 10 was repeated except the catalyst was vanadium phosphate. The yield of maleic anhydride was 50 percent.

EXAMPLE 12

20 grams of anhydrous uranium phosphate prepared as described above was mechanically mixed with 8 grams of vanadium phosphate (VPO₅). After calcination at 480°C. for about 12 hours the catalyst mixture was used for the conversion of butene-2 to maleic anhydride in the same manner as described for the runs in Table II above. The yield of maleic anhydride was 35.6 mole percent. The conversion of butene-2 was 100 percent. The vanadium content of the mixed catalyst calculated as V₂O₅ was 24 weight percent of the total. The V/U ratio was 0.9.

A comparison of the examples above shows the unexpected increase in the yield of maleic anhydride utilizing those catalysts wherein the vanadium, phosphorus, oxygen and uranium are intimately chemically admixed rather than mechanically admixed and wherein the weight percent $V_2O_5$ in the final catalyst is from 6 to 40, preferably 6 to 35.

When benzene was used in place of butene-2 in Example 6 above, even higher yields of maleic anhydride were obtained.

Resort may be had to such variations and modifications as fall within the spirit of the invention and the scope of the appended claims.

We claim:

1. In a process for the production of maleic anhydride by catalytic oxidation in the gas phase of an unsaturated material selected from the group consisting of benzene; an ethylenically unsaturated aliphatic hydrocarbon having from 4 to 5 carbon atoms per molecule and from 1 to 2 olefinic double bonds, and wherein said 4 carbon atom hydrocarbon is unbranched; and a monoethylenically unsaturated straight-chain aldehyde having from 4 to 5 carbon atoms per molecule and wherein the olefinic double bond is in the beta position with respect to the carbonyl group with a gas containing free molecular oxygen under oxidation conditions; the improvement which comprises carrying out said oxidation in the contact presence of a catalyst consisting essentially of a uranium salt of a phosphorus oxo acid, said catalyst having a composition within the formula $$U_xO_yP_zH_n$$

where $x$ is an integer from 1 to 3; $y$ is an integer from 6 to 16; $z$ is an integer from 1 to 4; and $n$ can vary from 0 to 2.

2. A process according to claim 1 wherein $y$ is an integer from 6 to 12; $z$ is an integer from 1 to 2; and $n$ is 1.

3. A process according to claim 2 wherein the catalyst is unsupported uranium phosphate.

4. A process according to claim 3 wherein the catalyst is uranyl phosphate.

5. A process according to claim 4 wherein the catalyst is arranged in a bed containing from 90 to 10 weight percent of a diluent inert material and from 10 to 90 weight percent of said uranyl phosphate and wherein the uranyl phosphate content increases through the bed in a direction parallel to the direction of flow of the reactants.

6. A process according to claim 1 wherein the weight percent of said unsaturated material in the charge stream entering the reactor is from 0.5 to 2.0 weight percent.

7. A process according to claim 4 wherein the charge stock is butene-2.

8. A process according to claim 4 wherein the charge stock is butene-1.

9. A process according to claim 4 wherein the charge stock is benzene.

10. A process according to claim 4 wherein the charge stock is crotonaldehyde.

11. A process according to claim 1 wherein the catalyst is at least one uranium compound selected from the class consisting of $UO_2HPO_4$; $UP_2O_7$; $U(HPO_4)_2$; $U(PO_3)_4$; and $U_3(PO_4)_4$.

12. A process according to claim 1 wherein the catalyst is uranyl phosphate.

13. A process in accordance with claim 12 wherein the unsaturated material is selected from the group consisting of benzene, and said ethylenically unsaturated aliphatic hydrocarbon and wherein the oxidation conditions include a temperature of from 375°C. to 600°C.

14. A process according to claim 12 wherein the unsaturated material is said monoethylenically unsaturated straight-chain aldehyde and wherein the oxidation conditions include a temperature of from 300°C. to 500°C.

15. A process for the production of maleic anhydride by catalytic oxidation in the gas phase of an unsaturated material selected from the group consisting of benzene, an ethylenically unsaturated aliphatic hydrocarbon having from 4 to 5 carbon atoms per molecule and from 1 to 2 olefinic double bonds, and wherein said four carbon atom hydrocarbon is unbranched; and a monoethylenically unsaturated straight-chain aldehyde having from 4 to 5 carbon atoms per molecule and wherein the olefinic double bond is in the beta position with respect to the carbonyl group which comprises contacting said unsaturated material and a gas containing free molecular oxygen under oxidation conditions with a catalyst prepared by a method which comprises:

mixing an anhydrous uranium salt with a solution of vanadyl oxalate to form a first reaction mixture wherein the vanadium to uranium ratio is 0.1:1 to 2:1;

and adding a sufficient amount of concentrated phosphoric acid to said first reaction mixture so that the uranium to phosphorus mole ratio is from 0.2:1 to 2:1 and the phosphorus to oxygen mole ratio is from 0.1:1 to 0.35:1 to precipitate said catalyst.

16. A process according to claim 15 wherein said catalyst is dried at a temperature from about 25°C. to about 140°C.

17. A process according to claim 16 wherein said dried reaction product is further treated by gradually increasing the temperature of said dried reaction product to 420°C. to 500°C.

18. A process according to claim 17 wherein the uranium salt is selected from the class consisting of uranium sulfate $UO_2HPO_4$, $UO_2$, $UO_3$ $U_2O_5$, $U_3O_8$, $UP_2O_7$, $U(HPO_4)_2$, $U(PO_3)_4$ and $U_3(PO_4)_4$.

19. A process according to claim 18 wherein the uranium salt is a uranium phosphate.

20. A process according to claim 19 wherein the anhydrous uranium phosphate is prepared by the steps of forming a precipitate by the addition of base to an aqueous solution of uranyl nitrate in concentrated phosphoric acid, drying and calcining said precipitate.

21. A process according to claim 20 wherein said base is $NH_4OH$.

22. A process according to claim 15 wherein the vanadium content of the catalyst is from about 6 to about 40 weight percent calculated as $V_2O_5$.

* * * * *